(12) United States Patent
Yang et al.

(10) Patent No.: US 8,714,334 B2
(45) Date of Patent: May 6, 2014

(54) EXTENDABLE CONVEYOR WITH MULTIFUNCTIONAL USER INTERFACE SECTION

(75) Inventors: Shenghong W. Yang, Plano, TX (US); Richard M. Kern, Highland Village, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 301 days.

(21) Appl. No.: 13/164,896

(22) Filed: Jun. 21, 2011

(65) Prior Publication Data

US 2011/0315507 A1 Dec. 29, 2011

Related U.S. Application Data

(60) Provisional application No. 61/358,030, filed on Jun. 24, 2010.

(51) Int. Cl.
*B65G 13/00* (2006.01)
*B65G 13/12* (2006.01)

(52) U.S. Cl.
CPC .................................... *B65G 13/12* (2013.01)
USPC ........ 193/35 TE; 198/588; 198/812; 198/313

(58) Field of Classification Search
USPC .......... 193/6, 35 TE, 35 G, 38; 198/594, 595, 198/588, 812, 313, 600, 346
See application file for complete search history.

(56) References Cited

U.S. PATENT DOCUMENTS

| | | | |
|---|---|---|---|
| 3,127,978 A * | 4/1964 | Zuercher | 198/812 |
| 7,422,096 B2 * | 9/2008 | Crookston | 198/346 |

\* cited by examiner

*Primary Examiner* — Ramya Burgess
*Assistant Examiner* — William R Harp

(57) ABSTRACT

An extendable boom loader and system. The extendable boom loader includes a distal boom element and a package tray. The boom element includes a package stop that moves to a first position blocking passage of packages and a second position allowing passage of packages, and a securing mechanism that holds the package stop in the first position. The package tray moves to first and second positions, respectively retracted within and extending from the boom element. The tray includes a tray package stop apparatus that prevents packages from sliding off a distal end of the tray. The distal boom element further includes a drawer unit that moves to first and second positions, respectively retracted within and extending from the tray. The drawer unit is configured to pivot down, while in its second position, to reach a floor of a container being loaded using the extendable boom loader.

20 Claims, 5 Drawing Sheets

EXTENDABLE CONVEYOR WITH MULTIFUNCTIONAL USER INTERFACE SECTION

CROSS-REFERENCE TO RELATED APPLICATIONS

The present application is related to, and claims priority to, U.S. Provisional Patent Application No. 61/358,030, filed Jun. 24, 2010, which is hereby incorporated by reference into the present application as if fully set forth herein.

TECHNICAL FIELD

The present disclosure is directed, in general, to mail and parcel handling equipment.

BACKGROUND OF THE DISCLOSURE

Improved and more efficient systems for loading parcels and other items into a container or trailer are desirable.

SUMMARY OF THE DISCLOSURE

Various disclosed embodiments include an extendable boom loader and system. In one embodiment, an extendable boom loader includes a distal boom element and a package tray. The distal boom element includes a package stop and a securing mechanism. The package stop is configured to move to a first position blocking passage of packages along the boom element and a second position allowing passage of packages. The securing mechanism is configured to hold the package stop in the first position. The package tray is configured to move to a first position, retracted within the distal boom element, and a second position, extending from the distal boom element. The package tray includes a tray package stop apparatus, configured to prevent packages from sliding off a distal end of the package tray. In particular embodiments, the distal boom element further includes a drawer unit, configured to move to a first position, retracted within the package tray, and a second position, extending from the package tray. The drawer unit is configured to pivot down, while in its second position, to reach a floor of a container being loaded using the extendable boom loader.

In another embodiment, an extendable boom loader includes a distal boom element, a drawer unit and a flap. The drawer unit is configured to move to a first position, retracted within the distal boom element, and a second position, extending from the distal boom element. The drawer unit is configured to pivot down, while in its second position, to reach a floor of a container being loaded using the extendable boom loader. The flap, rotatably coupled to a distal end of the drawer unit, is configured to move to a stowed position, positioned at least partially within the drawer unit, and a deployed position, wherein, in the deployed position, a side of the flap contacts the floor of the container.

In still another embodiment, an extendable boom loader system includes a distal boom element, a package tray, a first sensor, an operator control, and a controller. The distal boom element includes a package stop and a securing mechanism. The package stop is configured to move to a first position blocking passage of packages along the boom element and a second position allowing passage of packages. The securing mechanism is configured to hold the package stop in the first position. The package tray is configured to move to a first position, retracted within the distal boom element, and a second position, extending from the distal boom element. The first sensor is configured to sense the package tray in its first position. The controller is configured to receive a first signal from the operator control, receive a second signal from the first sensor, and move the distal boom element in response to the first signal only when the second signal indicates that the package tray is in its first position.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the term "couple" and its derivatives refer to any direct or indirect connection between two or more elements, whether or not those elements are in physical contact with one another; the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Loading packages into a truck, trailer, or other container is typically a physically challenging task. Given the often heavy weight of the packages loaded, the cramped working area, and the repetitive lifting of these packages, the task may lead to injuries. With the high costs of labor and worker's compensation insurance, it is highly desirable to provide a machine which reduces both the potential of injuries to workers and the physical labor required from the workers.

Extendable boom loaders are often installed at container loading docks. A base of the loader is typically mounted to a floor of a loading dock, just inside a bay door. A warehouse or other transfer facility typically has several loading docks with extendable loaders. Outside the transfer facility is a trailer/container "yard" where containers may be maneuvered into position adjacent to a selected loading dock, for loading or unloading. The loaders may be extended to reach into the positioned container, in order to minimize lifting and carrying of packages by loading personnel, and retracted to a stored position entirely within the transfer facility, to minimize space taken up by the loader when not in use and permit closing the bay door.

An extendable boom loader includes a plurality of boom elements that telescope from the base of the loader into the container. The boom elements are nested one within another, and within the base, proceeding from a largest boom element closest to the base (the "proximal boom element") to a smallest, innermost, boom element, which extends farthest into the container (the "distal boom element").

Some extendable loaders (referred to as "gravity loaders") are extendable into a container at an angle from the horizontal. In such loaders, gravitational forces cause packages to move into or out of the container along the loader on a plurality of free-rolling balls or cylinders. Other extendable loaders include a powered conveyor belt or other transport mechanism to move packages into or out of a container.

Figure 1:
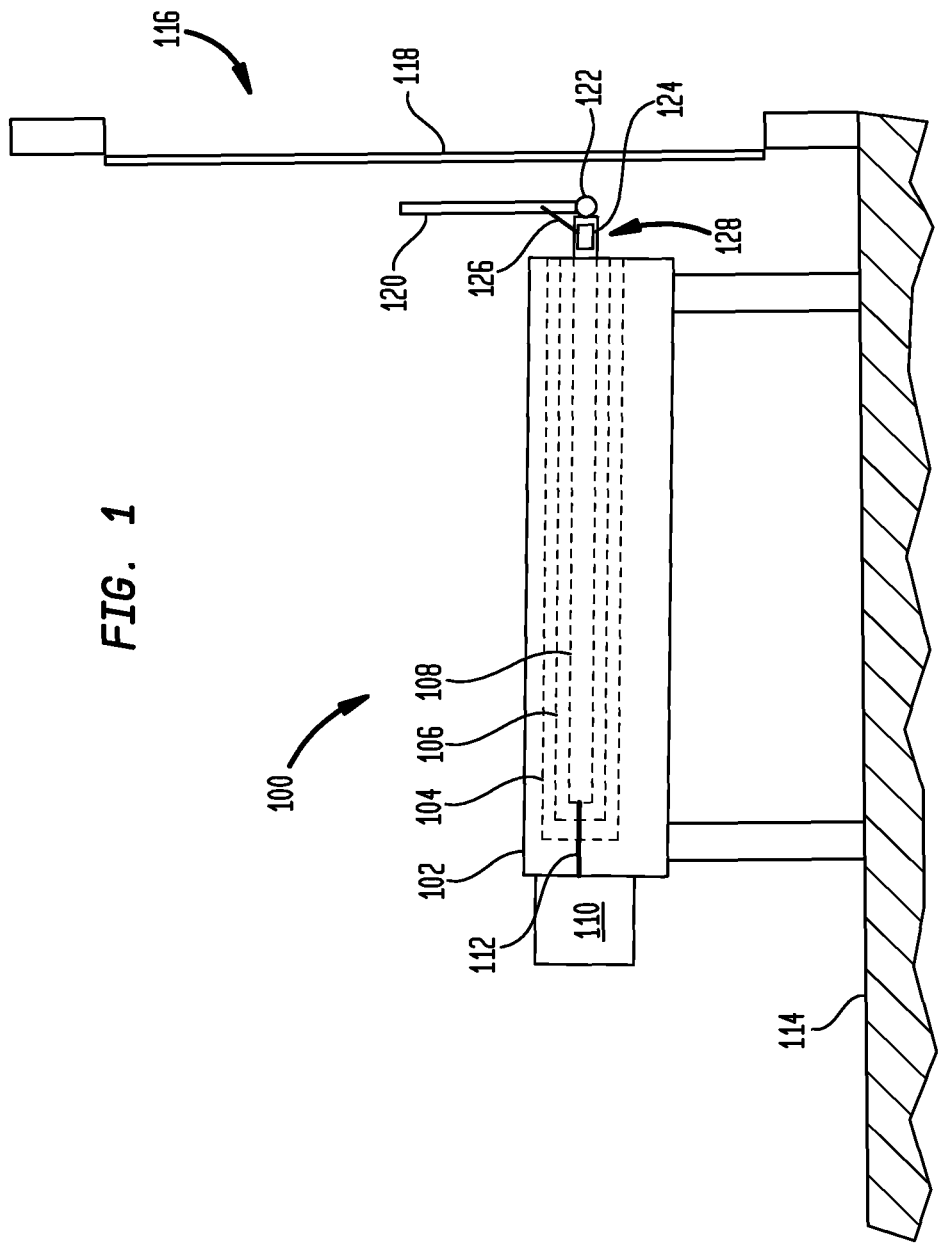
FIG. 1 depicts a side view of an extendable boom loader installed at a loading dock.

FIG. 1 depicts a side view of an extendable boom loader 100 installed at a loading dock 116. The loader 100 includes a base 102, a first boom element 104, a second boom element 106, and a third boom element 108. The first boom element 104 is a proximal boom element, the second boom element 106 is a medial boom element, and the third boom element 108 is a distal boom element. A boom drive mechanism 110 is mechanically coupled to some or all of the boom elements 104, 106 and 108 via a linkage 112 and is configured to extend and retract the boom elements 104, 106 and 108.

In a gravity loader, the boom elements 104, 106 and 108 are typically positioned at an angle of about 3.5 degrees to the horizontal, with the distal ends of the extended boom elements lower than the proximal ends, although boom elements may alternatively be positioned at greater or lesser angles to the horizontal. While the extendable boom loader 100 includes three boom elements, it will be understood that an extendable boom loader may include any desired number of boom elements. In an extendable boom loader having only one boom element, the sole boom element would be considered a distal boom element.

The extendable boom loader 100 is installed on a floor 114 of the loading dock 116, adjacent to a door 118 that may be opened and closed. A user interface section 120 is coupled to the third boom element 108 by a hinge 122. A deployment mechanism 128 for the user interface section 120 includes an actuator 124 that is mounted on the third boom element 108 and mechanically coupled to the user interface section 120 by a linkage 126. The deployment mechanism 128 is configured to move the user interface section 120 between a stowed position shown in FIG. 1 and a deployed position in which the user interface section is at substantially aligned with the boom element 108. In some applications, the user interface section 120 may be deployed at a shallower angle than the boom element 108, to provide a more horizontal platform for packages at the end of the loader 100. In other applications, the user interface section 120 may be deployed at a steeper angle than the boom element 108, to reach closer to a floor of a container being loaded using the loader 100.

One difficulty with the user interface section 120 is that additional space is required between the extendable boom loader 100 and the door 118 to accommodate the user interface section 120. Extendable loaders are typically installed close to loading dock doors to maximize the reach of the loader into a trailer or other container being loaded or unloaded. Another difficulty with the user interface section 120 results from a combination of the weight of the user interface section 120 and the short lever arm provided by the linkage 126, both of which place high mechanical stresses on the actuator 124, the linkage 126, and the couplings of those elements to each other and to the user interface section 120. Such stresses may result in frequent failures of the deployment mechanism 128. Still another difficulty with the user interface section 120 is that the hinge 122 is typically configured to allow the user interface section 120 to lower only into alignment with the distal boom element 108. As such, the user interface section 120 cannot be lowered to a position adjacent to a floor of a container, to deliver packages directly to a roller section that is provided in the floor of some types of containers.

Figure 2:
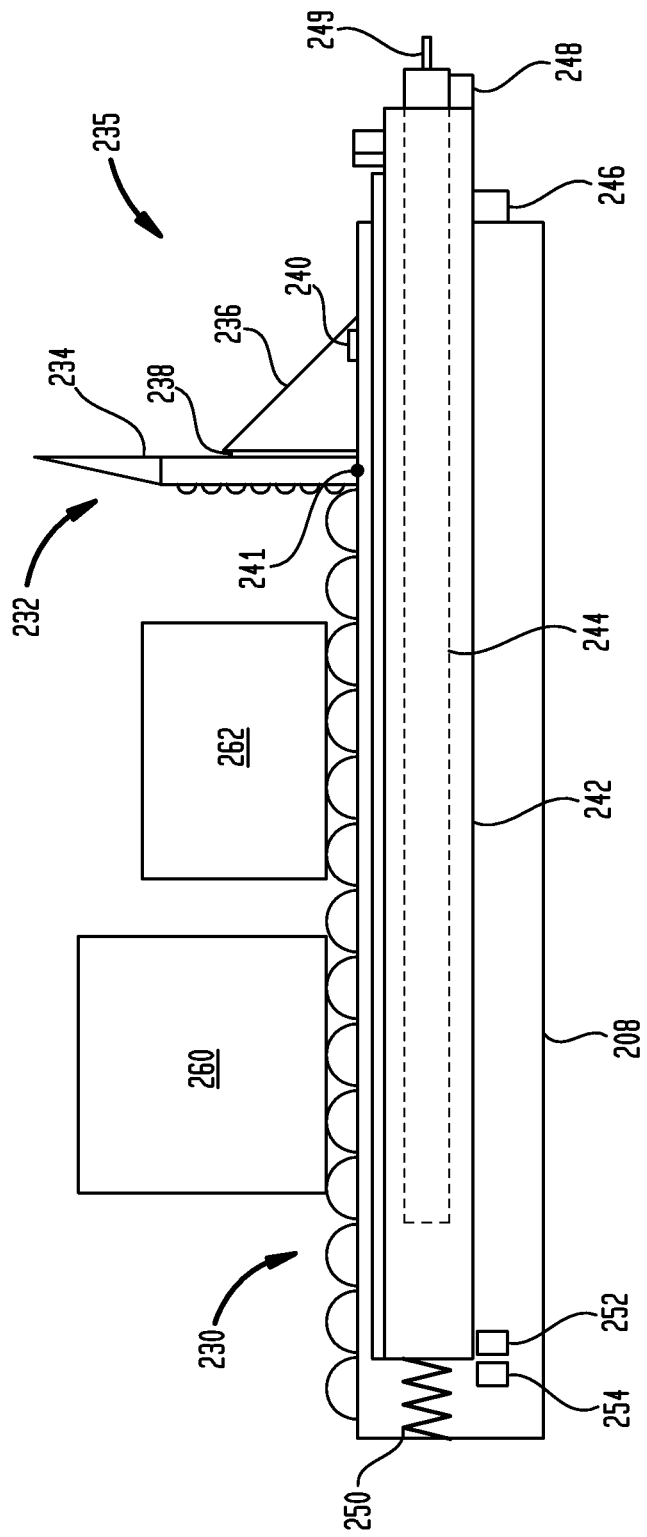
FIG. 2 depicts a side cutaway view of a distal boom element in a first configuration according to disclosed embodiments.

FIG. 2 depicts a side cutaway view of a distal boom element 208 in a first configuration according to disclosed embodiments. A near side of a distal boom element 208 is not depicted, to more clearly show internal components of the boom element 208. The boom element 208 may be used as the distal boom element in any suitable extendable boom loader, for example, as the distal boom element 108 in the extendable boom loader 100. The distal boom element 208 forms a multifunctional user interface section for its extendable boom loader. The distal boom element 208 includes a package tray 242 and a drawer unit 244. The package tray 242 nests within the boom element 208 and the drawer unit 244 nests within the package tray 242. On an upper side of the boom element 208 are rollers 230, upon which packages 260 and 262 roll under the force of gravity toward a distal end of the boom element 208 until they encounter a boom package stop apparatus 232.

Figure 3:
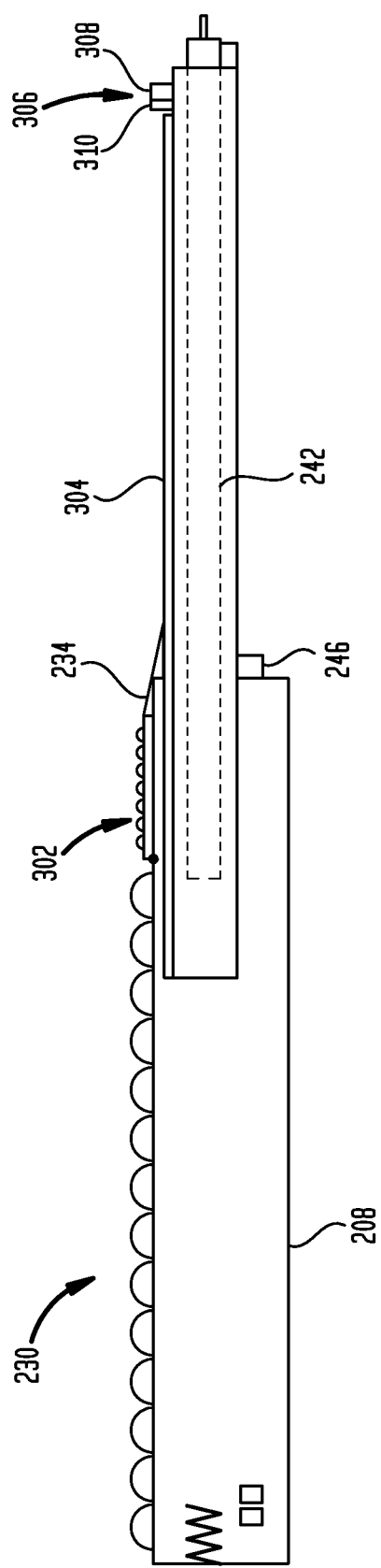
FIG. 3 depicts a side cutaway view of the distal boom element of FIG. 2 in a second configuration according to disclosed embodiments.

The boom package stop apparatus 232 includes a package stop 234, which pivots around a hinge 241 between a first position (shown in FIG. 2) and a second position (shown in FIG. 3). In the first position, the package stop 234 blocks passage of packages on the rollers 230. In the second position, the package stop 234 allows passage of packages. The package stop 234 is typically maintained in the first position whenever a trailer or other container is not actively being loaded.

The package stop 234 is held in the first position by a package stop securing mechanism 235. The package stop securing mechanism 235 includes a flange 236 that is rotatably coupled to the package stop 234 by a hinge 238. In a deployed position of the flange 236, shown in FIG. 2, the flange 236 engages a slot or other feature 240 of the distal boom element 208. The feature 240 prevents the flange 236 from rotating and holds the flange 236 in the deployed position. In the deployed position, the flange 236 resists pressure of packages that would cause the package stop 234 to rotate from its first position to its second position.

To rotate the package stop 234 from its first position to its second position, an operator pulls the package stop 234 away from the feature 240, causing the flange 236 to disengage from the feature 240. Once disengaged, the flange 236 may be rotated around the hinge 238 to lie flat against the package stop 234. The package stop 234 may then be rotated around the hinge 241 into the second position (shown in FIG. 3).

To rotate the package stop 234 from its second position to its first position, an operator clears any packages resting on the package stop 234 and holds back any packages on the rollers 230. The package stop 234 is then lifted from its second position into its first position. The package stop 234 may then be held in its first position while the flange 236 is rotated about the hinge 238 into its deployed position. The package stop 234 may then be moved toward the feature 240, causing the flange 236 to engage the feature 240, to hold the flange 236 in its deployed position. In other embodiments, the hinge 238 may include a spring or other biasing mechanism that biases the flange 236 toward its deployed position. In still other embodiments, the package stop securing mechanism 235 may be configured so that gravity moves the flange 236 into its deployed position when the package stop 234 is raised to its first position.

The package tray 242 is configured to move into first and second positions relative to the distal boom element 208. The package tray may roll or slide in tracks of the distal boom element 208 between its first and second positions. In the first position (shown in FIG. 2), the package tray 242 is retracted at least partially into the boom element 208. In the second position (shown in FIG. 3), the package tray 242 is extended at least partially from the boom element 208. When in the first position, the package tray 242 is held in position by a catch mechanism 246. An operator may grasp the package tray 242 with one hand and operate the catch mechanism 246 with the other hand to release the package tray 242, so that it can be pulled out of the boom element 208 into its second position.

The drawer unit 244 is also configured to move in into two positions relative to the package tray 242. In a first position (shown in FIG. 2), the drawer unit 244 is retracted at least partially into the package tray 242. In a second position (shown in FIG. 4), the drawer unit 244 is extended at least partially from the package tray 242. When in the first position, the drawer unit 244 is held in position by a catch mechanism 248. An operator may grasp the drawer unit 244 (or the handle 249) with one hand and operate the catch mechanism 248 with the other hand to release the drawer unit 244, so that it can be pulled out of the package tray 242 into its second position. Preferably, the drawer unit 244 is fabricated from lightweight materials, so that moving the drawer unit 244 by hand between its first and second positions is made easier for the operator.

When either the package tray 242 or the drawer unit 244 is returned to its first position, the catch mechanisms 246 and 248, respectively, automatically reengage to retain the package tray 242 or drawer unit 244 in its first position.

When the package tray 242 is in its first position, it is in contact with a spring 250 that resists movement of the package tray 242 deeper into the distal boom element 208. When the boom element 208 is being extended by its associated extendable boom loader, the spring 250 will help cushion any impact by the distal end of the package tray 242 against a container structure, a package within the container, a worker within the container, or any other object. A sensor 252 is configured to detect the package tray 242 when the package tray 242 is in its first position. If the distal end of the package tray 242 impacts an object, the package tray 242 moves against the force of the spring 250 further into the boom element 208 into a third position. A sensor 254 senses the package tray 242 in its third position.

As will be explained in greater detail with reference to FIG. 5, the extendable boom loader associated with the distal boom element 208 will not extend or retract its boom elements when the package tray 242 is not in its first position, as indicated by the sensor 252. Additionally, if the sensor 254 senses the package tray 242 in its third position while the extendable boom loader is extending its boom elements, it is an indication that the distal end of the package tray 242 has impacted an object. In response, the extendable boom loader stops its boom elements and retracts them by a selected amount, to move the distal end of the package tray 242 away from the object.

FIG. 3 depicts a side cutaway view of the distal boom element 208 in a second configuration according to disclosed embodiments. The operator has operated the catch mechanism 246 and pulled the package tray 242 out to its second position. The package stop 234 has been rotated into its second position, allowing passage of packages from the rollers 230 onto the package tray 242. On an upper side of the package stop 234 are rollers 302, upon which packages may roll under the force of gravity off the distal end of the distal boom element 208 onto the package tray 242. Packages may be removed from the package tray 242 and placed in a trailer or other container by personnel loading the container. Once the package tray 242 is cleared of packages, other packages may roll under the force of gravity off the distal end of the boom element 208 onto the package tray 242.

An upper side of the package tray 242 includes a high friction surface 304, configured to resist further motion of packages along the package tray 242 toward its distal end, once the packages leave the distal boom element 208. However, packages may continue to roll down the rollers 230 and 302 toward the package tray 242 and push packages already on the package tray 242 toward its distal end, despite the friction of the surface 304. A tray package stop apparatus 306 prevents packages from being pushed off the distal end of the package tray 242. The tray package stop apparatus 306 includes a block 308 and a low friction element 310 that is mounted to a side of the block 308 that faces packages on the package tray 242.

Figure 4:
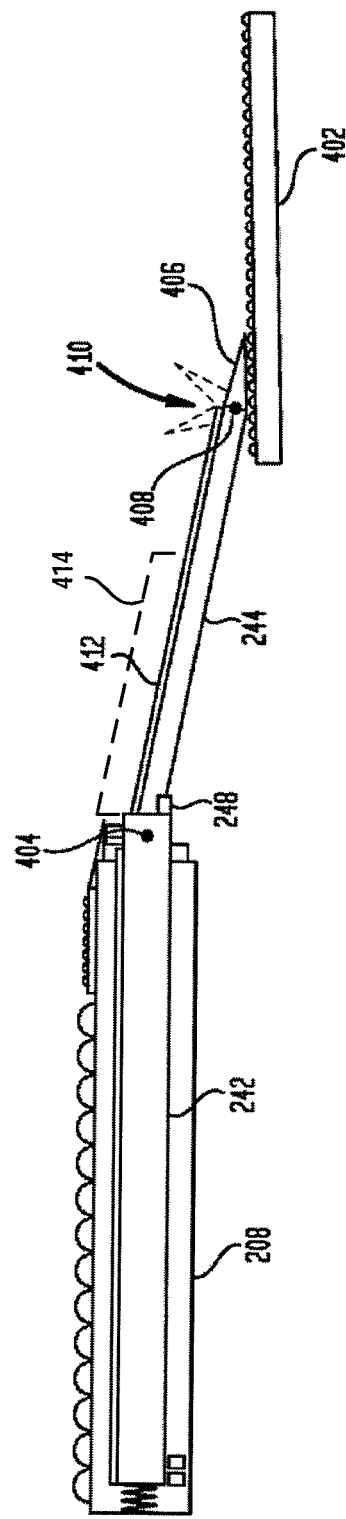
FIG. 4 depicts a side cutaway view of the distal boom element of FIG. 2 in a third configuration according to disclosed embodiments.

FIG. 4 depicts a side cutaway view of the distal boom element 208 in a third configuration according to disclosed embodiments. The operator has operated the catch mechanism 248 and pulled the drawer unit 244 into its second position. The drawer unit 244 is configured to rotate about a hinge 404 so that a distal end reaches a roller section 402. The roller section 402 is part of a trailer or other container being loaded and is provided within the trailer to facilitate the movement of packages toward the front of the trailer during loading. Roller sections are often provided in a "drop frame" trailer, which has a lower floor than other types of trailers.

The catch mechanism 248 may be a spring loaded mechanism that automatically reengages the drawer unit 244 when it is returned to its first position. In other embodiments, the catch mechanism may include captured pins that are inserted into, or withdrawn from, corresponding holes in the drawer unit in order to retain or release, respectively, the drawer unit in its first position.

A flap 406 is rotatably mounted to the distal end of the drawer unit 244 by a hinge 408. The flap 406 is configured to move between a stowed position (not shown in FIG. 4), in which the flap 406 is positioned at least partly within the drawer unit 244, so as not to interfere with moving the drawer unit 244 into its first position, retracted into the package tray 242. The flap 406 rotates through intermediate positions 410 into a deployed position, shown in FIG. 4. In the deployed position, a side of the flap 406 is configured to contact the roller section 402. A size of the side of the flap 406 contacting the roller section 402 is selected to be longer than a distance between rollers of the roller section 402, thereby reducing a likelihood that the distal end of the drawer unit 244 will get caught between rollers.

The drawer unit 244 includes a low friction surface 412, configured to allow packages to slide easily from the distal end of the distal boom element 208 to the roller section 402. The low friction surface 412 may be positioned on an upper surface of the drawer unit 244, as shown in FIG. 4. In other embodiments a drawer unit may be fabricated as a channel with raised sides, such as raised sides 414, to prevent packages from falling off the sides of the drawer unit, with the low friction surface positioned at the bottom of the channel.

While the distal boom element 208 includes both the package tray 242 and the drawer unit 244, other embodiments may include only a package tray or a drawer unit in a distal boom element. In embodiments including only a drawer unit, the drawer unit may be rotatably mounted directly to the distal boom element, rather than indirectly via the package tray, and the first and second sensors may sense the drawer unit in first and third positions, as described with reference to the package tray 242.

Figure 5:
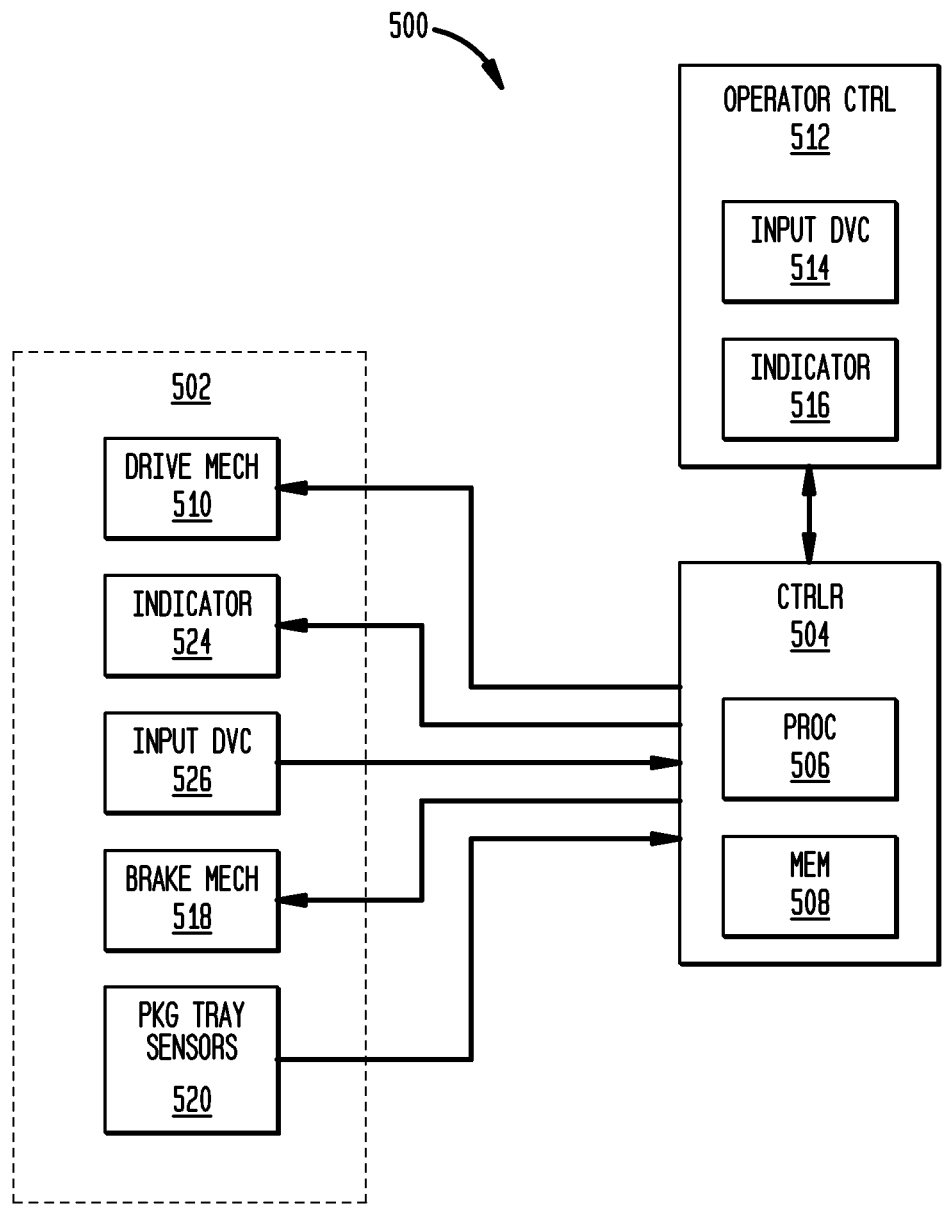
FIG. 5 depicts a block diagram of an extendable boom loader system according to disclosed embodiments.

FIG. 5 depicts a block diagram of an extendable boom loader system 500 in accordance with disclosed embodiments. The extendable boom loader system 500 includes an operator control 512, a controller 504, and an extendable boom 502. The extendable boom 502 includes one or more boom elements, including a distal boom element 208, as described with reference to FIGS. 2-4.

The operator control 512 includes an input device 514 and an indicator 516. A boom operator uses the input device 514 to signal the controller 504 to extend or retract the extendable boom 502. The input device 514 may be a joystick, rocker switch, touch-sensitive screen or other suitable user interface device. The controller 504 uses the indicator 516 to signal the operator a current condition of a drive mechanism 510 on the extendable boom 502 (activated or deactivated). The indicator 516 may be one or more lamps or LEDs, a character display, a graphical display, or other suitable user interface device. The extendable boom 502 also includes an input device 526 and an indicator 524, with similar functionality to the input device 514 and indicator 516. Typically, the input device 526 and indicator 524 are mounted on or adjacent to the distal boom element 208, which provides a multifunctional user interface for the extendable boom 502. In other embodiments, either the input device 514 or the input device 526 may additionally or alternatively include a button or other suitable switch to use as a 'kill switch' to cause the controller 504 to immediately engage the brake mechanism 518 and stop motion of the extendable boom 502.

The controller 504 includes data processing hardware such as a processor 506 and storage 508 that can include volatile memory, non-volatile memory, optical storage, magnetic storage, or other computer-readable storage media as known to those in the art. The controller 504 can be implemented using one or more physical systems, and may include multiple processors 506 or storage 508; the examples herein refer to these in the singular, but are not intended to limit the physical implementations.

The extendable boom 502 includes the input device 526, the indicator 524, the drive mechanism 510, configured to extend and retract the extendable boom 502, the brake mechanism 518, configured to stop motion of all boom elements of the extendable boom 502, and package tray sensors 520, comprising the sensors 252 and 254. The controller 504 is configured to receive signals from the input device 526 and the package tray sensors 520, and to send signals to the drive mechanism 510, the indicator 524, and the brake mechanism 518.

When the extendable boom 502 is not extending or retracting, the controller 504 engages the brake mechanism 518 to prevent unpowered extension or retraction of the extendable boom 502. When the operator activates the input device 514 or the input device 526, the controller 504 receives one or more signals indicating a status of the input device 514 or 526, and a status of the sensors 252 and 254. If the operator has indicated retraction of the extendable boom 500 and the signal from the sensor 252 indicates that the package tray 242 is in its first, retracted, position, then the controller 504 activates the drive mechanism 510 to retract the extendable boom 502. If the operator has indicated extension of the extendable boom, the signal from the sensor 252 indicates that the package tray 242 is in its first, retracted, position, and the signal from the sensor 254 indicates that the package tray 242 is not being pressed further into the boom element 208 by an object in contact with the package tray 242, then the controller 504 activates the drive mechanism 510 to extend the extendable boom 502.

The controller 504 continues to operate the drive mechanism 510 as long as the operator continues to signal continued motion using the input device 514 or the input device 524. When the operator releases or otherwise deactivates the input device 514 or 524, the controller 504 may receive one or more signals indicating the deactivation of the input device 514 and, in response, the controller 504 deactivates the drive mechanism 510 and engages the brake mechanism 518, to bring the extendable boom 502 to a rapid halt.

In other embodiments, the controller 504 may cease receiving signals indicating the activation of the input device 514 and, after a predetermined time period, determine that the operator has released or otherwise deactivated the input device 514. In response to such determination, the controller 504 deactivates the drive mechanism 510 and engages the brake mechanism 518, to bring the extendable boom 502 to a rapid halt. In all embodiments, the controller 504 continues to engage the brake mechanism 518 as long as the operator is not signaling for extension or retraction of the boom using the input device 514 or the input device 524.

While the extendable boom 502 is in motion, the controller 504 may receive a signal from the sensor 252 indicating that the package tray 242 is no longer in its first, retracted, position. In some embodiments, a cessation of the signal indicating that the package tray is in its first position is the indication that the package tray is no longer in its first position. In response to such an indication, the controller 504 deactivates the drive mechanism 510 and engages the brake mechanism 518, to bring the extendable boom 502 to a rapid halt.

While the extendable boom 502 is in motion, the controller 504 may receive a signal from the sensor 254 indicating that the package tray 242 has been moved into its third position, i.e., pressed further into the boom element 208. The controller 504 reacts to receipt of such a signal by deactivating the drive mechanism 510 and engaging the brake mechanism 518, to bring the extendable boom 502 to a rapid halt. The controller then activates the drive mechanism 510 to retract the extendable boom 502 by a predetermined distance (for example six inches) to move the distal end of the package tray 242 away from any object that pushed the package tray 242 into its third position. In other embodiments, the controller 504 may activate the drive mechanism 510 to retract the extendable boom 502 immediately upon receiving the signal from the sensor 254, without first activating the brake mechanism 518 to stop movement of the extendable boom 502.

It will be understood that some steps of the exemplary process presented above may be performed simultaneously, concurrently, or in a different order than presented above.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. An extendable boom loader, comprising:
    a distal boom element, including:
    a package stop, configured to move to a first position blocking passage of packages along the boom element and a second position allowing passage of packages, and
    a securing mechanism, configured to hold the package stop in the first position; and
    a package tray, configured to move to a first position, retracted within the distal boom element, and a second position, extending from the distal boom element, the package tray including a tray package stop apparatus, configured to prevent packages from sliding off a distal end of the package tray.

2. The extendable boom loader of claim 1, wherein the distal boom element further includes a drawer unit, configured to move to a first position, retracted within the package tray, and a second position, extending from the package tray, wherein the drawer unit is configured to pivot down, while in its second position, to reach a floor of a container being loaded using the extendable boom loader.

3. The extendable boom loader of claim 1, wherein the package tray includes a surface on an upper side of the package tray having sufficient friction to resist motion of the packages along the package tray toward the distal end.

4. The extendable boom loader of claim 1, wherein the distal boom element further comprises a package tray catch mechanism, configured to retain the package tray in its first position.

5. The extendable boom loader of claim 1, wherein the distal boom element further comprises a first sensor, configured to sense the package tray in its first position.

6. The extendable boom loader of claim 5, wherein the distal boom element further comprises a second sensor, configured to sense the package tray when the package tray is in a third position, the third position further into the distal boom element than the first position.

7. The extendable boom loader of claim 6, wherein the distal boom element further comprises a biasing mechanism to bias the package tray away from its third position and toward its first position.

8. An extendable boom loader, comprising:
    a distal boom element;
    a drawer unit, configured to move to a first position, retracted within the distal boom element, and a second position, extending from the distal boom element, the drawer unit configured to pivot down, while in its second position, to reach a floor of a container being loaded using the extendable boom loader; and
    a flap, rotatably coupled to a distal end of the drawer unit, configured to move to a stowed position, positioned at least partially within the drawer unit, and a deployed position, wherein, in the deployed position, a side of the flap contacts the floor of the container.

9. The extendable boom loader of claim 8, wherein the floor of the container includes a plurality of rollers and the side of the flap contacts some of the rollers, a size of the side of the flap contacting the roller selected based upon a distance between the rollers.

10. The extendable boom loader of claim 8, wherein the distal boom element further comprises a drawer catch mechanism, configured to retain the drawer unit in its first position.

11. The extendable boom loader of claim 8, wherein the drawer unit includes a surface on an upper side of the drawer unit having sufficiently low friction that a package can slide easily along the surface.

12. The extendable boom loader of claim 8, wherein the drawer unit includes raised sides, configured to prevent packages from falling off the drawer unit in the directions of the raised sides.

13. The extendable boom loader of claim 8, wherein the distal boom element further comprises:
    a package stop, configured to move to a first position blocking passage of packages along the boom element and a second position allowing passage of packages, a securing mechanism, configured to hold the package stop in the first position; and the extendable boom loader further comprises a package tray, configured to move to a first position, retracted within the boom element, and a second position, extending from the boom element, the package tray including a tray package stop apparatus, configured to prevent packages from sliding off a distal end of the package tray, wherein the first position of the drawer unit is retracted within the package tray and the drawer unit is rotatable coupled to a distal end of the package tray.

14. The extendable boom loader of claim 13, wherein the boom element further comprises a package tray catch mechanism, configured to retain the package tray in its first position.

15. An extendable boom loader system, comprising:

a distal boom element, including:

a package stop, configured to move to a first position blocking passage of packages along the boom element and a second position allowing passage of packages, and a securing mechanism, configured to hold the package stop in the first position;

a package tray, configured to move to a first position, retracted within the boom element, and a second position, extending from the boom element, and a first sensor, configured to sense the package tray in its first position;

an operator control; and a controller configured to:

receive a first signal from the operator control;

receive a second signal from the first sensor, and move the distal boom element in response to the first signal only when the second signal indicates that the package tray is in its first position.

16. The extendable boom loader system of claim 15, the distal boom element further including a second sensor, configured to sense the package tray when the package tray is in a third position, the third position further into the boom element than the first position, wherein the controller is further configured, while moving the distal boom element, to stop moving the distal boom element when a third signal from the third sensor indicates that the package tray is in its third position.

17. The extendable boom loader system of claim 16, wherein the distal boom element further comprises a biasing mechanism to bias the package tray away from its third position and toward its first position.

18. The extendable boom loader system of claim 15, wherein the controller is further configured, while moving the distal boom element, to stop moving the distal boom element in response to an indication from the first sensor that the package tray is not in its first position.

19. The extendable boom loader system of claim 15, further comprising a brake mechanism configured to stop motion of the distal boom element, the controller further configured to activate the brake mechanism to stop moving the distal boom element.

20. The extendable boom loader system of claim 15, wherein the distal boom element further comprises a package tray catch mechanism, configured to retain the package tray in its first position.

* * * * *